US008686070B2

(12) United States Patent
Bakeev et al.

(10) Patent No.: US 8,686,070 B2
(45) Date of Patent: Apr. 1, 2014

(54) NANOCRYSTALLINECELLULOSE (NCC) IN TAPE JOINT COMPOUND (JC)

(71) Applicant: Hercules Incorporated, Wilmington, DE (US)

(72) Inventors: Kirill N. Bakeev, Newark, DE (US); Thomas J. Podlas, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 13/770,129

(22) Filed: Feb. 19, 2013

(65) Prior Publication Data

US 2013/0225732 A1 Aug. 29, 2013

Related U.S. Application Data

(60) Provisional application No. 61/602,671, filed on Feb. 24, 2012.

(51) Int. Cl.

| | |
|---|---|
| ***C04B 40/00*** | (2006.01) |
| ***C04B 24/38*** | (2006.01) |
| ***C04B 26/28*** | (2006.01) |
| ***C08L 1/26*** | (2006.01) |
| ***C09K 3/10*** | (2006.01) |
| ***C08K 9/04*** | (2006.01) |

(52) U.S. Cl.
USPC ................. 524/44; 524/43; 524/45; 524/425; 524/445; 106/819

(58) Field of Classification Search
CPC ...... C04B 24/383; C04B 14/10; C04B 28/145
USPC ........................ 524/43, 44, 45, 425, 445, 449
See application file for complete search history.

(56) References Cited

U.S. PATENT DOCUMENTS

| | | | | |
|---|---|---|---|---|
| 5,382,287 | A | 1/1995 | Podlas | |
| 5,512,616 | A | 4/1996 | Podlas | |
| 7,108,744 | B2 | 9/2006 | Podlas | |
| 8,105,430 | B2 | 1/2012 | Boluk et al. | |
| 2005/0056187 | A1 * | 3/2005 | Podlas | 106/15.05 |
| 2005/0235878 | A1 | 10/2005 | Podlas | |
| 2010/0162926 | A1 | 7/2010 | Thomson et al. | |
| 2012/0043039 | A1 * | 2/2012 | Paltakari et al. | 162/157.6 |

FOREIGN PATENT DOCUMENTS

| | | |
|---|---|---|
| JP | 2001058888 | 3/2001 |
| WO | 8908148 | 9/1989 |
| WO | 2011039423 | 4/2011 |
| WO | 2012005960 | 1/2012 |

OTHER PUBLICATIONS

ISR, PCT/US2013/026640, Jul. 29, 2013, pp. 3.

* cited by examiner

*Primary Examiner* — Ling-Siu Choi
*Assistant Examiner* — Ronald Grinsted
(74) *Attorney, Agent, or Firm* — Shaorong Chen; Joanne Rossi; Michael Herman

(57) ABSTRACT

A joint compound with improved crack resistance is formed by combining water, a filler such as calcium carbonate, a latex emulsion binder, a thickening system such as methylhydroxyethyl cellulose, and nanocrystalline cellulose. The nanocrystalline cellulose is provided in an amount effective to reduce the crack formation during drying.

17 Claims, 2 Drawing Sheets

Suppressed crack formation with added NCC 0.3% MHEC + 0.1% NCC

FIG. 2

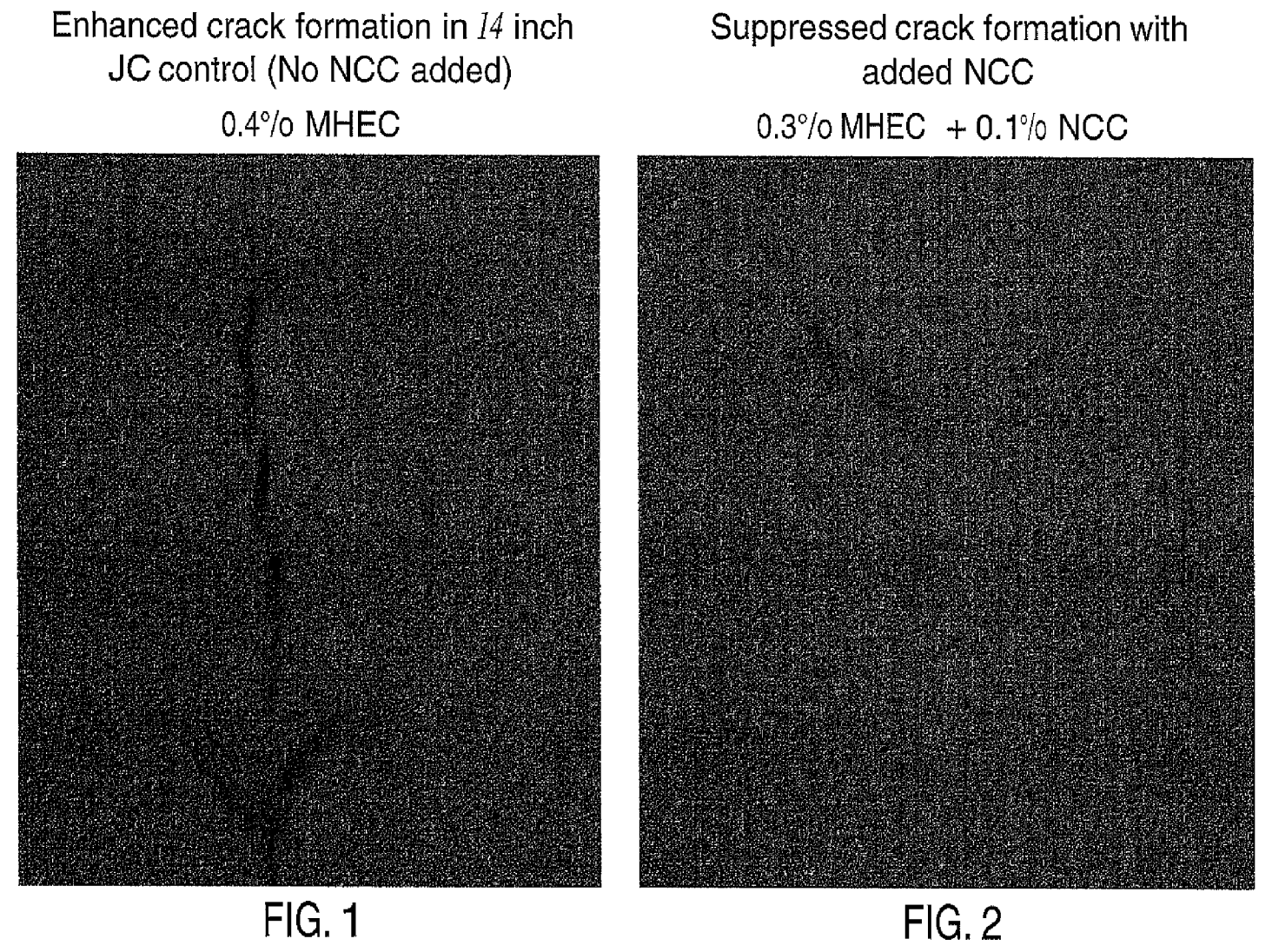

Enhanced crack formation in 14 inch JC control (No NCC added)

0.4% MHEC

FIG. 1

NANOCRYSTALLINECELLULOSE (NCC) IN TAPE JOINT COMPOUND (JC)

CROSS REFERENCE TO RELATED APPLICATIONS

The present application claims the benefit under 35 U.S.C. 119(e) of U.S. Provisional Patent Application Ser. No. 61/602,671, filed Feb. 24, 2012, the entire content of which is hereby expressly incorporated herein by reference.

BACKGROUND OF THE INVENTION

1. Field of the Disclosed and Claimed Inventive Concepts

The presently disclosed and claimed inventive concept(s) relates generally to a joint compound that can totally eliminate cracking in various thicknesses of the joint compound and thick coatings. Specifically, the joint compound comprises nanocrystalline cellulose, water, a filler, a binder and a thickener.

2. Background and Applicable Aspects of the Presently Disclosed and Claimed Inventive Concept(s)

Wallboard is generally installed in large panels, which are nailed, screwed, or glued to the studding of walls of buildings. The joints where sections of the wallboard are butted together are covered with a joint compound and then a fiberglass or paper reinforcing tape is embedded within the joint compound and then permitted to dry. When the joint compound is dry, a second application of the joint compound is applied over the joint and is permitted to dry. A coating of the joint compound is also applied to cover nail heads or screws or any cracks in the wall board and let dry. After the joint compound dries, the joint and covering of the nails or screws are lightly sanded and the wall is then finished with decorating material such as paint.

Typically, tape joint compositions, which are normally referred to as joint compounds, contain a binder, a thickener system, a filler, water, a biocide, clay and mica. This joint composition is a ready-mix, drying type composition that is normally sold in five-gallon cans or corrugated boxes. The water and filler are the ingredients that comprise the largest weight percentage in the joint composition. Joint compounds are either regular weight compounds that are the traditional type or lightweight compounds.

Optimally, a joint compound will not alter its dimensions as it dries. However, when a relatively thick coating of the joint compound is applied to a surface, it can crack as it dries. The thicker the coating is the more likely the cracking and the more severe the cracking. This requires additional applications to fill in the voids in the cracks, increasing the cost of finishing a wall surface.

BRIEF DESCRIPTION OF THE DRAWINGS

FIG. 1 is a photograph showing a thick coating of dried joint compound which does not include nanocrystalline cellulose.

FIG. 2 is a photograph showing a thick coating of dried joint compound which includes nanocrystalline cellulose.

DETAILED DESCRIPTION

Figure 4:
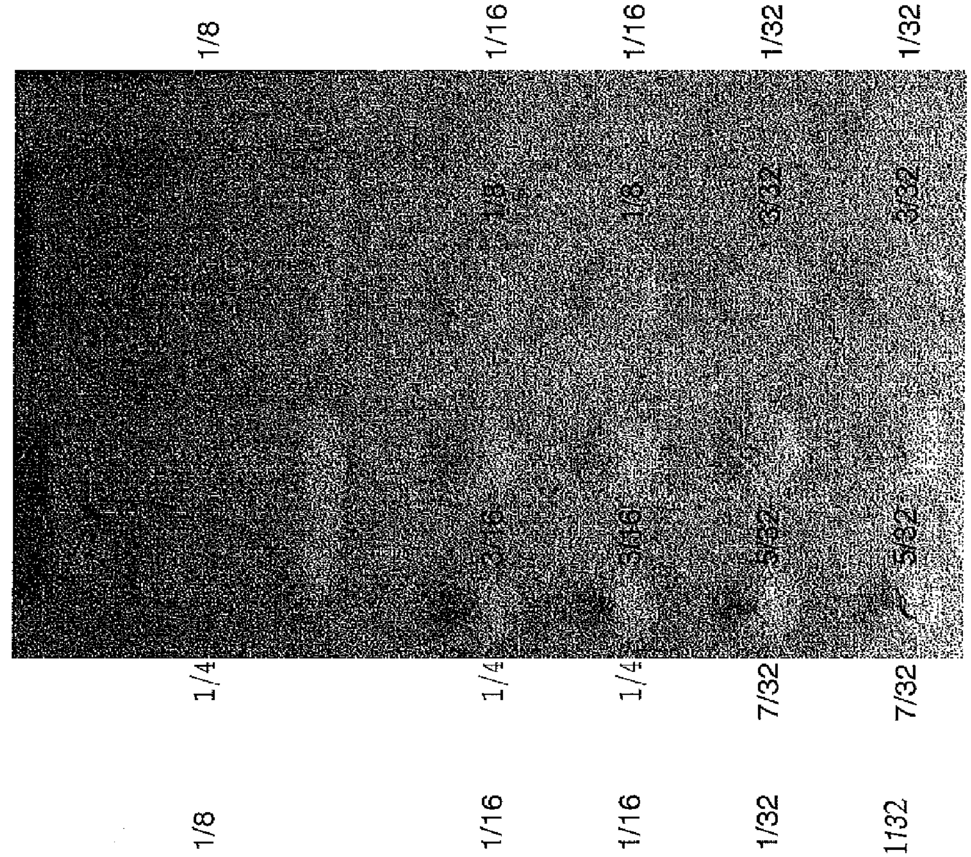
FIG. 4 is a photograph of the compound shown in FIG. 2 with nanocrystalline cellulose.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of chemistry described herein are those well known and commonly used in the art. Reactions and purification techniques are performed according to manufacturer's specifications or as commonly accomplished in the art or as described herein. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analysis, pharmaceutical preparation, formulation, and delivery, and treatment of patients.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, and/or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

In accordance with the presently disclosed and claimed inventive concept(s), a joint compound comprises nanocrystalline cellulose, a binder, a thickener, a filler, water, a biocide and clay. Additional components that are commonly used in joint compounds are perlite, mica, preservatives, wetting agents, defoamers, and plasticizers. With the exception of perlite and mica, these additional components are normally used in minor amounts generally ranging from about 0.05 to about 1.0% by weight based on the total dry weight of the compound.

Nanocrystalline cellulose is a crystalline portion of cellulose which can be formed by acid hydrolysis of cellulose combined with mechanical treatment. These nanometer size cellulose particles are crystalline in nature, insoluble in water, stable, chemically inactive and physiologically inert with attractive binding properties.

Cellulose is one of the most abundant biopolymers on earth, occurring in wood, cotton, hemp and other plant-based material and serving as the dominant reinforcing phase in plant structures. Cellulose can also be synthesized by algae, tunicates, and some bacteria. It is a homopolymer of glucose repeating units which are connected by 1-4 β-glycosidic linkages. The 1-4 β-linkages form cellulose in linear chains, which interact strongly with each other through hydrogen bonds. Because of their regular structure and strong hydrogen bonds, cellulose polymers are highly crystalline and aggregate to form substructures and microfibrils. Microfibrils, in turn aggregate to form cellulosic fibers.

Purified cellulose from wood or agricultural biomass can be extensively disintegrated or produced by bacterial processes. If the cellulosic material is composed of nanosized fibers, and the properties of the material are determined by its nanofiber structure, these polymers are described as nanocelluloses or nanocrystalline cellulose. The terms are used interchangeably herein.

In general, nanocelluloses are rod shaped fibrils with a length/diameter ratio of approximately 20 to 200. In one non-limiting embodiment, the nanocelluloses have a diameter less than about 60 nm. In another non-limiting embodiment, the nanocelluloses have a diameter between about 4 nm to about 15 nm, and a length of about 150 nm to about 350 nm. The size and shape of the crystals vary with their origins. For example, but not by way of limitation, nanocrystalline cellulose from wood can be about 3 to about 5 nm in width and about 20 to about 200 nm in length. Other nanocrystalline cellulose obtained from other sources such as cotton may have slightly different dimensions.

The nanocrystalline cellulose has high stiffness, large specific surface area, high aspect ratio, low density and reactive surfaces that can facilitate chemical grafting and modification. At the same time, the material is inert to many organic and inorganic substances.

The production of nanocrystalline cellulose by fibrillation of cellulose fibers into nano-scale elements requires intensive mechanical treatment. However, depending upon the raw material and the degree of processing, chemical treatments may be applied prior to mechanical fibrillation. Generally preparation of nanocrystalline cellulose can be described by two methods, acid hydrolysis and mechanical defibrillation. In the first method, nanocellulose can be prepared from the chemical pulp of wood or agricultural fiber mainly by acid hydrolysis to remove the amorphous regions, which then produce nano-size fibrils. The hydrolysis conditions are known to affect the properties of the resulting nanocrystals. Different acids also affect the suspension properties. Nanocrystal size, dimensions, and shape can also be determined to a certain extent by the nature of the cellulose source.

The acid hydrolysis can be conducted using a strong acid under strictly controlled conditions of temperature, agitation and time. The nature of the acid and the acid-to-cellulosic ratio are also important parameters that affect the preparation of nanocellulose. Examples of the acids can include, but are not limited to, sulfuric acid, hydrochloric acid, phosphoric acid and hydrobromic acid. The hydrolysis temperature can range from room temperature up to about 70° C. and the corresponding hydrolysis time can be varied from about 30 minutes to about 12 hours depending on the temperatures. Immediately following hydrolysis, suspension can be diluted to stop the reaction.

In one non-limiting embodiment, the suspension can be diluted from about five-fold to about ten-fold to stop the reaction. Then the suspension can be centrifuged, washed once with water and re-centrifuged and washed again. This process can be repeated for about four to five times to reduce the acid content. Regenerated cellulose dialysis tubes or Spectrum Spectra/Pro regenerated cellulose dialysis membrane having a molecular cutoff of about 12,000-14,000 can be used to dialyze the suspension against distilled water for several days until the water pH reach a constant value, for example but not by way of limitation, a pH value of about 7.0.

To further disperse and reduce the size of the cellulose crystals, the suspensions of cellulose crystals can be processed by either sonicating or passing through a high shear micro fluidizer. This kind of prepared material is referred to as nanocellulose, nanocrystalline cellulose (NCC), cellulose nanocrystals, cellulose nanofibres or cellulose whiskers.

The second method is primarily a physical treatment. Bundles of microfibrils called cellulose microfibril or microfibrillated cellulose with diameters from tens of nanometers (nm) to micrometers (μm) are generated by using high pressure homogenizing and grinding treatments. A novel process using high-intensity ultrasonication has also been used to isolate fibrils from natural cellulose fibers. High intensity ultrasound can produce very strong mechanical oscillating power, so the separation of cellulose fibrils from biomass is possible by the action of hydrodynamic forces of ultrasound. This method can produce a microfibrillated cellulose with a diameter with a diameter less than about 60 nm. In one non-limiting embodiment, a microfibrillated cellulose between about 4 nm to about 15 nm, and a length less than 1000 nm. The microfibrillated cellulose can optionally further undergo chemical, enzymatic and/or mechanical treatment. Both methods for preparing nanocrystalline cellulose are described in U.S. Pat. No. 8,105,430, the entire disclosure of which is hereby incorporated by reference.

Generally, about 0.05% to about 0.5% by weight of nanocrystalline cellulose can be used. In one non-limiting embodiment, about 0.05 to about 0.15% by weight can be incorporated into the joint compound.

The binder is typically a latex emulsion, for example, but not by way of limitation, polyvinyl alcohol, ethylene vinyl acetate latex, or polyvinyl acetate) latex. The binder is a coalescent agent that upon drying of the compound forms a thin matrix to hold the compound. In other words, the binder is the matrix that holds the other components in their proper places so as to form the desired product. Hence, the binder is an essential ingredient in the joint compound. Other materials that can be used as binder can include, but are not limited to, starch, casein, polyacrylamide, and copolymers of acrylamide and acrylic acid. In general, the binder ranges from a lower limit of about 1% to an upper limit of about 3%, by weight based on the total weight of the compound. In one non-limiting embodiment, the upper limit can be about 2.5 weight % by weight, based on the total weight of the compound.

The thickener of the presently disclosed and claimed inventive concept(s) can be, for example, but by no way of limitation, ethylhydroxytethyl cellulose (EHEC), hydroxyethyl cellulose (HEC), hydrophobically modified hydroxyethyl cellulose, hydroxypropyl methylcellulose (HPMC), methylhydroxyethyl cellulose (MHEC), carboxymethyl cellulose (CMC), hydroxypropyl guar, and underivatized guar.

The amount of the thickener in the joint compound can have a lower limit of about 0.01 weight % based on the total dry weight of the joint compound (excluding the water present in the joint compound). In one non-limiting embodiment, the lower limit can be about 0.3 weight % based on the total dry weight of the joint compound. The upper limit of the thickener system can be about 0.6 weight %. In one non-limiting embodiment, the upper limit can be about 0.5 weight %.

Fillers are an important component in joint compounds. They serve the purpose of adding body to the joint compound, making the compound economical, and controlling the pH of the compound. Conventional fillers that can be used either alone or in combination in the presently disclosed and inventive concept(s) can include, but are not limited to, calcium carbonate, calcium sulfate dihydrate (gypsum), and dolomitic limestone. Calcium sulfate hemihydrate (plaster of Paris) may be used as a minor component in the presence of other fillers in order to better control open time and cracking and other joint compound properties.

In one non-limiting embodiment, the filler can be finely ground calcium carbonate. The filler can be a dry powder, which usually comprises at least about 45 weight % based on the weight of the joint compound. In one non-limiting embodiment, the filler comprises at least 50 weight %, based on the weight of the joint compound. Generally, the filler can fall within the range of about 45 to an upper limit of about 65% by weight. In order to achieve the desired pH of the compound of 8 to 10, the filler is the principal alkaline ingredient and therefore, is the main ingredient that controls the pH. If necessary, a pH modifier may be also added to increase the alkalinity of the compound.

Water can be added to the dry ingredients of the joint compound to provide the viscosity of the joint compound composition generally in the range of from about 300 to about 700 Brabender units.

Biocides increase the shelf life of the joint compound and prevent the composition from spoiling. In other words, biocides prevent microorganisms, such as mold, bacteria, and fungi, from growing in the compound and also on the walls of the building structure in which it is used. Examples of two efficient industry-accepted biocides can be Mergal®174, 2[(hydroxymethyl)amino]ethanol, a broad spectrum biocide, manufactured by Troy Chemical Corp; and Proxel™ GXL product, 1,2-benzisothiazolin-3-one, an all purpose biocide, manufactured by Arch Chemicals, Inc.

Other biocides can include, but are not limited to, copper oxine, zinc stearate, calcium borate, zinc borate, barium borate, zinc omadine, zinc omadine/zinc oxide mix, 2,5-dimethyl-1,3,5-thiadiazinane-2-thione (Thione), 2-n-octyl-4-isothiazolin-3-one (octhilinone), 5-chloro-2-methyl-4-isothiazolin-3-one, 2-methyl-4-isothiazolin-3-one, hexahydro-1,3,5-triethyl-2-triazine, 5-bromo-5-nitro-1,3-dioxane, 2-(hydroxymethyl)amino-ethanol, 2-(hydroxymethyl)amino-2-methylpropanol, α-benzoyl-α-chloroformaldoxime, benzylbromoacetate, p-chloro-m-xylenol, bis-(2-hydroxy-5-chlorophenyl)sulfide, p-tolydiiodomethylsulfone, 3-iodo-2-propynylbutylcarbamate, bis-(2-hydroxy-5-chlorophenyl) methylene, dipropylamine ether, dodecylamine, and 1-(3-chloroallyl)-3,5,7-triaza-1-azoniaadamantane chloride.

The biocide should generally be present in the amount ranging from a lower limit of about 0.05 to an upper limit of about 1.0% by weight based on the total weight of the compound.

In accordance with the presently disclosed and claimed inventive concept(s), suitable clays for use in a joint compound can be any of the natural earthy, fine-grained, largely crystalline substances of hydrous aluminum silicates usually containing alkalis, alkaline earth, and iron that make up the group of clay materials. Included in this group can be, but are not limited to, sepiolite, montmorillonite, bentonite, illite, kaolin, and attapulgite. In one non-limiting embodiment, the clay is attapulgite. Attapulgite can typically be used at levels ranging from about 1.5 to about 3.5% of the total weight of the joint compound.

If a lightweight drying type joint compound having improved crack resistance is desired, the lightweight property can be provided by incorporating specially treated expanded perlite into the formulation. It is well known in the art that the expanded perlite should have a particle size that can pass through a 100-mesh screen, if it is to be incorporated into a joint compound. The expanded perlite can be a very lightweight material which can contain many fine cracks and fissures which may be penetrated by water and could thereby destroy its ability to render the joint compound lightweight. As a result, the expanded perlite is often treated to render it water-insensitive. The preferred method is to treat the expanded perlite with a silicone compound but other materials may be used to render it water-insensitive. The specially treated expanded perlite is commercially available from suppliers such as Silbrico Corporation. If non-treated perlite is used, care is taken to prevent undue water absorption during manufacture and over the expected shelf life of the joint compound. The lightweight examples illustrated herein were prepared using Silbrico's SiiCell® 3534 product, a surface treated perlite that is commonly used in the industry. The perlite can be used in amounts having an upper limit of about 8.5 weight percent. In one non-limiting embodiment, the upper limit can be 6.0 weight percent.

Depending on local preferences, other ingredients may be used in the joint compound formulations. These can include, but are not limited to, air entraining agents, surfactants, humectants, pH buffering salts, defoamers, and mixtures thereof.

Normally, joint compounds can be prepared by combining all of the wet ingredients and mixing for one minute to homogenize. A blend of all the solids is then added to the mixing bowl, with continuing mixing. The entire mass is blended for a total of up to about 20 minutes. Different manufacturers may modify this procedure. In general, the higher the concentration of clay, the greater the required mixing time. Hence, the use of the reduced levels of clay described herein may in many cases permit the reduction of said mix time, with increase in total plant output.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

Preparation of Nanocrysalline Cellulose

Nanocrystalline cellulose (NCC) was prepared using the procedure similar to D. G. Gray et al, Langmuir, V.12, p. 2076-2082 (1996), which is incorporated herein by reference in its entirety. The details of the procedure are given below.

Prior to acid hydrolysis, the pulp was fluffed using a grinder. The fluffed pulp was hydrolysed in about 65% of sulfuric acid at about 45° C. for about 2 hrs. The solid content of the reaction was about 10%. First, the fluffed pulp was added into acid in a water bath with mechanical mixing and allowed to hydrolyze. After hydrolysis, the cellulose suspension was diluted with deionized (DI) water (~10 times volumes of the acid solution) and centrifuged twice to remove the acid. 2% sodium carbonate solution was then added to neutralize the residue acid. The suspension was dialyzed with DI water to remove the salt. The purified suspension was dried to determine the yield.

Evaluations

In order to evaluate the initial crack formation of the joint compound of the presently disclosed and claimed inventive concept(s), the following joint compound formulation was prepared:

Water—31.5 weight percent
30 micron $CaCO_3$—60.9 weight percent
Attapulgite clay—2 weight percent
Mica—3 weight percent
PVA latex (55%)—2 weight percent
MHEC—0.4 weight percent This is a standard joint compound formulation. A formulation utilizing the presently disclosed and claimed inventive concept(s) was prepared using the same components listed above. However, the percentage of MHEC was reduced to 0.3 weight percent and 0.1 weight percent of nanocrystalline cellulose was added.

Quarter-inch thick layers of each of the above joint compounds were applied to a surface at a thickness of ¼ inch, and allowed to dry. The images of the dried joint compound layers are shown in FIGS. 1 and 2. FIG. 1 shows the joint compound with 0.4% MHEC, the joint compound shown in FIG. 2 has 0.3% MHEC and 0.1% NCC. The crack formation in FIG. 1, without the nanocrystalline cellulose, is significantly larger and more developed than that with the nanocrystalline cellulose in FIG. 2.

Figure 3:
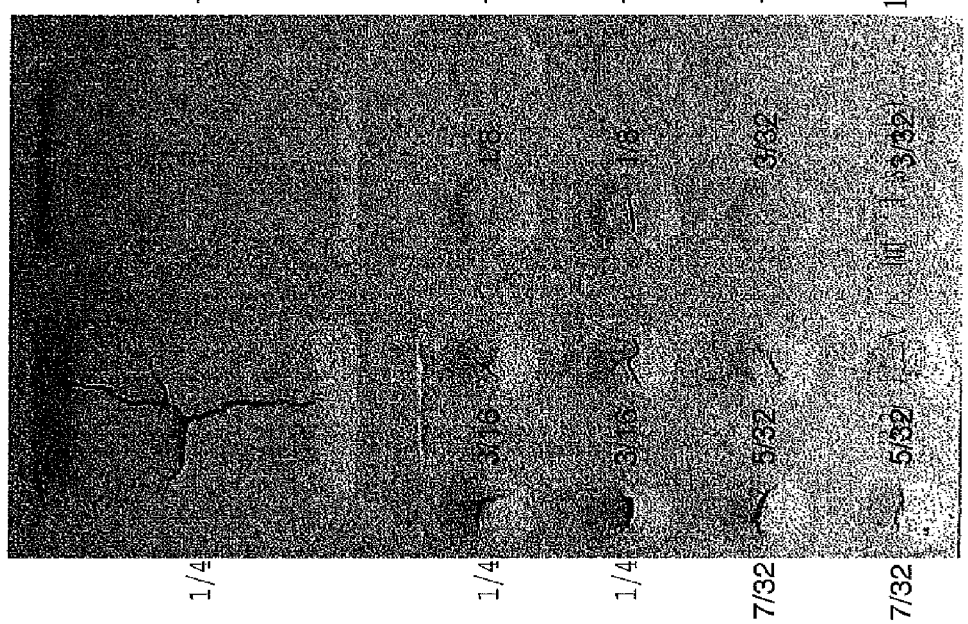
FIG. 3 is a photograph of the compound shown in FIG. 1 without nanocrystalline cellulose.

To further test this, the same compounds were tested at varying thicknesses from 1/32 of an inch up to ¼ of an inch. The disk on the lower right of FIGS. 3 and 4, being 1/32, with the disk on the upper left being ¼ inch. The thickness of the two disks at the bottom of each column varied from the thickness of the two disks at the top of each column by 1/32 of an inch. The sample with 0.4% MHEC, FIG. 3, shows a significant crack at ⅛ of an inch, whereas, the sample with the 0.1% NCC, FIG. 4, shows crack formation at about 5/32 of an inch and significantly less crack formation.

This evidence demonstrates that by including a small percentage of nanocrystalline cellulose into joint compound formulations, crack formation can be significantly reduced. At the same time, this permits reduction in the amount of thickener added to the composition.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. A joint compound comprising nanocrystalline cellulose, water, a filler, a binder and a thickener, wherein the amount of the nanocrystalline cellulose is effective to improve crack resistance of the joint compound upon drying; wherein the nanocrystalline cellulose has a length to diameter ratio of from about 20 to 200; and wherein the diameter of the nanocellulose is less than 60 nanometers.

2. The joint compound of claim 1, wherein the nanocrystalline cellulose is present in an amount of from about 0.05 to about 0.5 percent by weight based on the total weight of the compound.

3. The joint compound of claim 1, wherein the filler is selected from the group consisting of calcium carbonate, calcium sulfate dihydrate, limestone, calcium sulfate hemihydrate, and combinations thereof.

4. The joint compound of claim 3, wherein the filler comprises calcium carbonate.

5. The joint compound of claim 4, wherein the filler is present in an amount of from about 45 to about 65 percent by weight based on the total weight of the compound.

6. The joint compound of claim 1, wherein the binder is selected from the group consisting of polyvinyl alcohol, ethylene vinyl acetate latex, polyvinyl acetate) latex, starch, casein, polyacrylamide, copolymers of acrylamide and acrylic acid, and combinations thereof.

7. The joint compound of claim 6, wherein the binder is present in an amount of from about 1 to about 2.5 percent by weight based on the total weight of the compound.

8. The joint compound of claim 1, wherein the thickener is selected from the group consisting of carboxymethyl cellulose, ethylhydroxyethyl cellulose, hydroxyethyl cellulose, hydrophobically modified hydroxyethyl cellulose, hydroxypropylmethyl cellulose, methylhydroxyethyl cellulose, methylcarboxycellulose, hydroxypropyl guar, underivatized guar, and combinations thereof.

9. The joint compound of claim 8, wherein the thickener is present in an amount of from about 0.3 to about 0.5 percent by weight based on the total weight of the compound.

10. The joint compound of claim 8, wherein the thickener is methylhydroxyethyl cellulose.

11. The joint compound of claim 1 further comprising petlite.

12. The joint compound of claim 1 further comprising a biocide.

13. The joint compound of claim 12, wherein the biocide is present in an amount ranging from about 0.05 to about 1.0% by weight based on the total weight of the compound.

14. The joint compound of claim 1 further comprising about 1.5 to about 3.5 percent by weight of clay based on the total weight of the compound.

15. The joint compound of claim 14, wherein the clay comprises attapulgite clay.

16. The joint compound of claim 1 further comprising mica.

17. The joint compound of claim 1, wherein the nanocrystalline cellulose is present in an amount of about 0.05 to about 0.1% by weight and the thickener is present in an amount of from about 0.3 to 0.5% by weight based on the total weight of the compound.

* * * * *